United States Patent
Namai

(10) Patent No.: US 7,699,545 B2
(45) Date of Patent: Apr. 20, 2010

(54) SHUTTER DEVICE AND IMAGE PICKUP APPARATUS

(75) Inventor: Akihiro Namai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 11/858,824

(22) Filed: Sep. 20, 2007

(65) Prior Publication Data

US 2008/0118242 A1     May 22, 2008

(30) Foreign Application Priority Data

Nov. 20, 2006   (JP) .............................. 2006-312483

(51) Int. Cl.
*G03B 9/10*     (2006.01)
*G03B 9/36*     (2006.01)

(52) U.S. Cl. ....................................... 396/493; 396/483

(58) Field of Classification Search ................ 396/452, 396/471, 483, 484, 485, 488, 490, 493
See application file for complete search history.

(56) References Cited

U.S. PATENT DOCUMENTS 5,457,514 A * 10/1995 Hasuda et al. .............. 396/273
5,758,213 A *  5/1998 Goto et al. .................. 396/235
6,072,958 A *  6/2000 Hasuda ....................... 396/235

FOREIGN PATENT DOCUMENTS

JP            6-265975 A       9/1994

* cited by examiner

*Primary Examiner*—Rodney E Fuller
(74) *Attorney, Agent, or Firm*—Canon U.S.A., Inc. I.P. Division

(57) ABSTRACT

A shutter device includes a blade member and a detecting unit. The blade member includes a first blade, a second blade, a detection portion, and a limiting portion. The blade member controls a time of exposure, performed on a recording medium, on the basis of a magnitude of a width of a slit. The slit includes slit portions and is provided when the first and second blades travel. The slit portions are provided at the detection portion and limiting portion, respectively. The detecting unit detects a state of the slit width. A cut-away portion is provided at the blade member so that a width of the slit portion at the detection portion is greater than a width of the slit portion at the limiting portion. The detection portion is detected by the detecting unit. The limiting portion limits the exposure time.

4 Claims, 9 Drawing Sheets

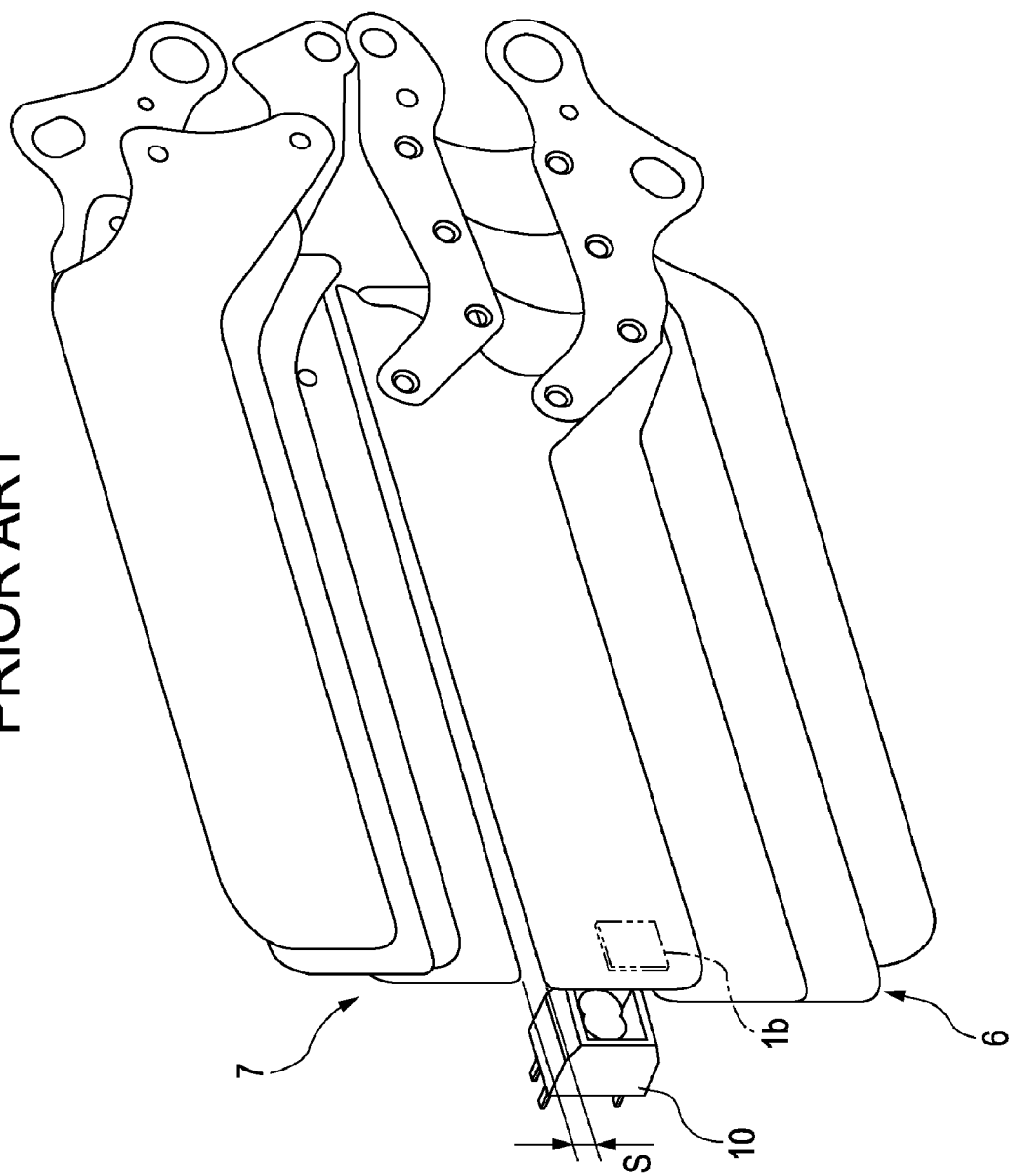

SHUTTER DEVICE AND IMAGE PICKUP APPARATUS

BACKGROUND OF THE INVENTION

1. Field of the Invention

The present invention relates to a shutter device including a first blade and a second blade, and to an image pickup apparatus.

2. Description of the Related Art

In general, as a shutter used in a single lens reflex camera, a focal-plane shutter including two sets of light-shielding members, first blades (a first curtain) and second blades (a second curtain), is used. Prior to exposure, the first blades of the focal-plane shutter cover an aperture. Then, when shooting is performed, first, the first blades withdraw from the aperture to start the exposure on an image pickup surface. Thereafter, after a predetermined time, the shutter device operates so that the second blades cover the aperture.

When a high-speed time control is performed at the focal-plane shutter, the width of a slit, formed by portions of the first blades and the second blades, is reduced to achieve the high-speed time control.

Japanese Patent Laid-Open No. 6-265975 discusses a focal-plane shutter including a detecting unit that makes use of a light-emitting diode and a photo-transistor to detect the width of a slit, formed by portions of first blades and second blades, that is, a shutter-blade open time. In addition, it discusses a shutter device that can detect whether or not a shutter precision is within a predetermined range.

In recent years, shutter speed is remarkably being increased, and the width of a slit, formed by portions of first blades and second blades, is being reduced. Therefore, as in the shutter device discussed in the aforementioned document, there is a problem that, when an open time of shutter blades is detected by a detecting unit that makes use of a light-emitting diode and a photo-transistor, a difference is produced between an actual slit open time and the slit open time detected by the detecting unit.

Such a related shutter is described with reference to FIGS. 4 to 9. FIG. 4 is a front view of a related focal-plane shutter, showing a state in which charging of shutter blades is completed. Reference numeral 1 denotes a shutter bottom plate having an aperture 1a at a central portion thereof. Reference numeral 21 denotes a first blade driving lever rotatably mounted to a shaft 1c of the shutter bottom plate 1 and rotationally biased clockwise in FIG. 4 by a torsion spring (not shown). The first blade driving lever 21 is provided with a blade driving pin 21a at the illustrated right end thereof, and is connected to a first main blade arm (described later). A first armature 22 is mounted to the illustrated top portion of the first blade driving lever 21. In the completed charging state shown in FIG. 4, the first armature 22 is in contact with an adhesion surface of a first blade electromagnet 23 affixed to a bottom plate (not shown).

Reference numeral 24 denotes a second blade driving lever rotatably mounted to a shaft id of the shutter bottom plate 1 and rotationally biased clockwise in FIG. 4 by a torsion spring (not shown). The second blade driving lever 24 is provided with a blade driving pin 24a at the illustrated right end thereof, and is connected to a second main blade arm (described later). A second blade armature 25 is mounted to the illustrated top portion of the second blade driving lever 24. In the completed charging state shown in FIG. 4, the second blade armature 25 is in contact with an adhesion surface of a second blade electromagnet 26 affixed to a bottom plate (not shown).

Reference numeral 27 denotes a charge lever, which is rotatably mounted to a shaft 1e of the shutter bottom plate 1. In the completed charging state shown in FIG. 4, cam surfaces 27a and 27b of the charge lever 27 maintain the first blade driving lever 21 and the second blade driving lever 24 in the shutter charge state shown in FIG. 4 through a charge pin 21b of the first blade driving lever 21 and a charge pin 24b of the second blade driving lever 24.

FIG. 5 is a front view of the completed charging state of the shutter blades, and FIG. 6 is a perspective rear view of the completed charging state of the shutter blades.

Reference numeral 2 denotes a first main blade arm, which is rotatably mounted to a shaft 3 mounted to the shutter bottom plate 1. Reference numeral 4 denotes a first sub blade arm, which is rotatably mounted to a shaft 5 mounted to the shutter bottom plate 1. Reference numeral 6 denotes a first blade unit (first curtain) constituting the shutter blades and including four blades, a first blade 6a, a second first blade 6b, a third first blade 6c, and a fourth first blade 6d. These first blades 6a to 6d are rotatably mounted to the first main blade arm 2 and the first sub blade arm 4 through shafts to constitute a link mechanism. Accordingly, when the first main blade arm 2 is rotated to the right in FIG. 5 by the first blade driving lever 21, the aperture 1a of the shutter bottom plate 1 opens as the first blade unit 6 is folded.

Reference numeral 7 denotes a second blade unit (second curtain) constituting, along with the shutter blade unit 6, the shutter blades, and having the same structure as the first blade unit 6 (that is, including four second blades, a first second blade to a fourth second blade). The second blades are connected to a second main blade arm 8 and a second sub blade arm 9 through shafts to constitute a link mechanism. Accordingly, when the second main blade arm 8 is rotated to the right in FIG. 5 by the second blade driving lever 24, the aperture 1a of the shutter bottom plate 1 is closed as the second blade unit 7 is opened from its folded state.

Reference numeral 10 denotes a photo-reflector (hereunder referred to as "PR element") including a light-emitting diode (hereunder referred to as "LED") and a photo-transistor (hereunder referred to as "PTR"). As shown in FIG. 6, the photo-reflector 10 is formed so that, during shutter operation, it measures an open time of the shutter blades on the basis of reflection of light, emitted from the LED, from a mirror 11 (shown in FIG. 7 and described later) through a hole 1b in the shutter plate 1.

FIG. 7 is a block diagram of an electrical structure of a camera including the above-described focal-plane shutter. Reference numeral 101 denotes a central processing unit (CPU) that controls the entire camera. Reference numeral 102 denotes EEPROM that stores, for example, camera function data. Reference numeral 103 denotes a main switch that starts the camera body. Reference numeral 104 denotes a first switch that is turned on when a release button (not shown) is pressed to a first stroke position, to start, for example, a photometric operation or a focal-point detecting operation. Reference numeral 105 denotes a second switch which turns on when the release button is pressed to a second stroke position, to start a release operation for exposure. Reference numeral 106 denotes a photometric sensor, and reference numeral 107 denotes a distance-measuring sensor using a publicly known CCD line sensor.

Reference numeral 108 denotes a lens controlling circuit that controls driving of a replaceable shooting lens 109 of a single lens reflex camera. Reference numeral 110 denotes a shutter controlling circuit connected to the first blade electromagnet 23 (which controls operation of the first blade unit 6 of the focal-plane shutter) and to the second blade electromagnet 26 (which controls operation of the second blade unit 7 of the focal-plane shutter). Reference numeral 10 denotes the aforementioned PR element including an LED 10a and a PTR 10b. The PR element is formed so that the CPU 101 controls light emission from the LED 10a, causes projection light of the LED 10a to be reflected by the mirror 11, and causes the reflected light to be receivable by the PTR 10b. In this structure, operation of a shutter blade that passes between the PR element 10 and the mirror 11 is detected. Reference numeral 111 denotes a motor, which, on the basis of a control signal from a motor controlling circuit 112, drives a mirror charge mechanism 113 and a shutter charge mechanism 114, drives a mirror (not shown) during a shooting operation, and controls driving of the charge lever 27 that charges the shutter.

Next, operations of portions, related to the operation of the focal-plane shutter, of the camera having the above-described structure will be described.

First, in a state in which the first blade electromagnet 23 and the second blade electromagnet 26 of the shutter are electrified, the mirror (not shown) is withdrawn from a shooting light path by the operation of the motor 111. At the same time, the charge lever 27 is rotated counterclockwise from the state shown in FIG. 4 by the operation of the motor 111, and the first blade driving lever 21 and the second blade driving lever 24 are made rotatable clockwise in FIG. 4 by biasing force of a driving lever spring (not shown). At this time, the first blade electromagnet 23 and the second blade electromagnet 26 are in an electrified state. Therefore, the first curtain armature 22 and the second curtain armature 25 are attracted to and held by the first blade electromagnet 23 and the second blade electromagnet 26, respectively, so that the first blade driving lever 21 and the second blade driving lever 24 are held in the state shown in FIG. 4. When, in this state, the electrification of the first blade electromagnet 23 is stopped, the first blade driving lever 21 rotates clockwise in FIG. 4 by the biasing force of the driving spring (not shown), so that the first main blade arm 2 (shown in FIG. 5) also rotates. By this, the first blade unit 6 starts to open.

Next, when the electrification of the second blade electromagnet 26 is stopped, the second blade driving lever 24 rotates clockwise in FIG. 4 by the biasing force of the driving spring (not shown), so that the second main blade arm 8 (shown in FIG. 5) also rotates. By this, the second blade unit 7 starts to close. The operation of the shutter is controlled as a result of controlling a timing in which the electrification of the first blade electromagnet 23 and that of the second blade electromagnet 26 are stopped.

During the operation of the shutter, the LED 10a of the PR element 10 is made to emit light, and the light reflected from the mirror 11 is received by the PTR 10b through the hole 1b of the shutter bottom plate 1. Accordingly, the open time of the shutter blades is measured.

FIG. 8 illustrates a change in output voltage of the PTR 10b during the operation of the shutter, with the horizontal axis representing time and the vertical axis representing the voltage of the PTR 10b. A waveform 31 during a time in which the shutter is fully opened is obtained, so that a result of measurement of a time T1 is obtained with a voltage determination level 32 as a reference.

FIG. 9 is a perspective rear view showing a state in which the shutter is operating at a maximum speed time (1/8000 seconds). To make it easier to see FIG. 9, the shutter bottom plate 1 is not shown. A high speed time of the focal-plane shutter is achieved by controlling the width of a slit S formed by the first blade unit 6 and the second blade unit 7. However, when the width of the slit S is reduced, as indicated by a waveform 33 shown in FIG. 8, the second blade unit 7 arrives before the first blade unit 6 passes completely in front of the PR element 10. Therefore, the voltage of the PTR 10b, which corresponds to the output voltage of the PR element 10, is not a voltage indicating "total bright state." Rather, it is a voltage indicating "a dark state."

Further, when the shutter precision is reduced due to a change in, for example, durability, and the width of the slit S is further reduced, as indicated by a waveform 34 shown in FIG. 8, the voltage of the PTR 10b, which corresponds to the output voltage of the PR element 10, does not reach the voltage determination level 32. Therefore, the shutter open time cannot be measured.

Even if, in the above-described condition, an attempt is made to correct the change in the shutter precision or to detect the closing of the blades, the correction of the change in the shutter precision and the detection of the closing of the blades cannot be performed precisely.

SUMMARY OF THE INVENTION

The present invention has been made in consideration of the above situation, and provides a shutter device and an image pickup apparatus which can precisely measure a shutter open time.

According to the present invention, a shutter device includes a blade member and a detecting unit. The blade member includes a first blade, a second blade, and a detection portion. The blade member controls a time of exposure, performed on a recording medium, on the basis of a magnitude of a width of a slit. The slit includes slit portions and is provided when the first blade and the second blade travel. The detecting unit detects a state of the slit width. A cut-away portion is provided at the blade member so that a width of the slit portion at the detection portion of the blade member is wider than a width of the slit portion at a limiting portion of the blade member. The detection portion is detected by the detecting unit. The limiting portion limits the exposure time.

Other embodiments, features, aspects and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a perspective rear view showing a state in which the related focal-plane shutter is operating.

DESCRIPTION OF THE EMBODIMENT

Exemplary embodiments, features and aspects of the present invention will be described in detail in accordance with the accompanying drawings.

First Exemplary Embodiment

Figure 1:
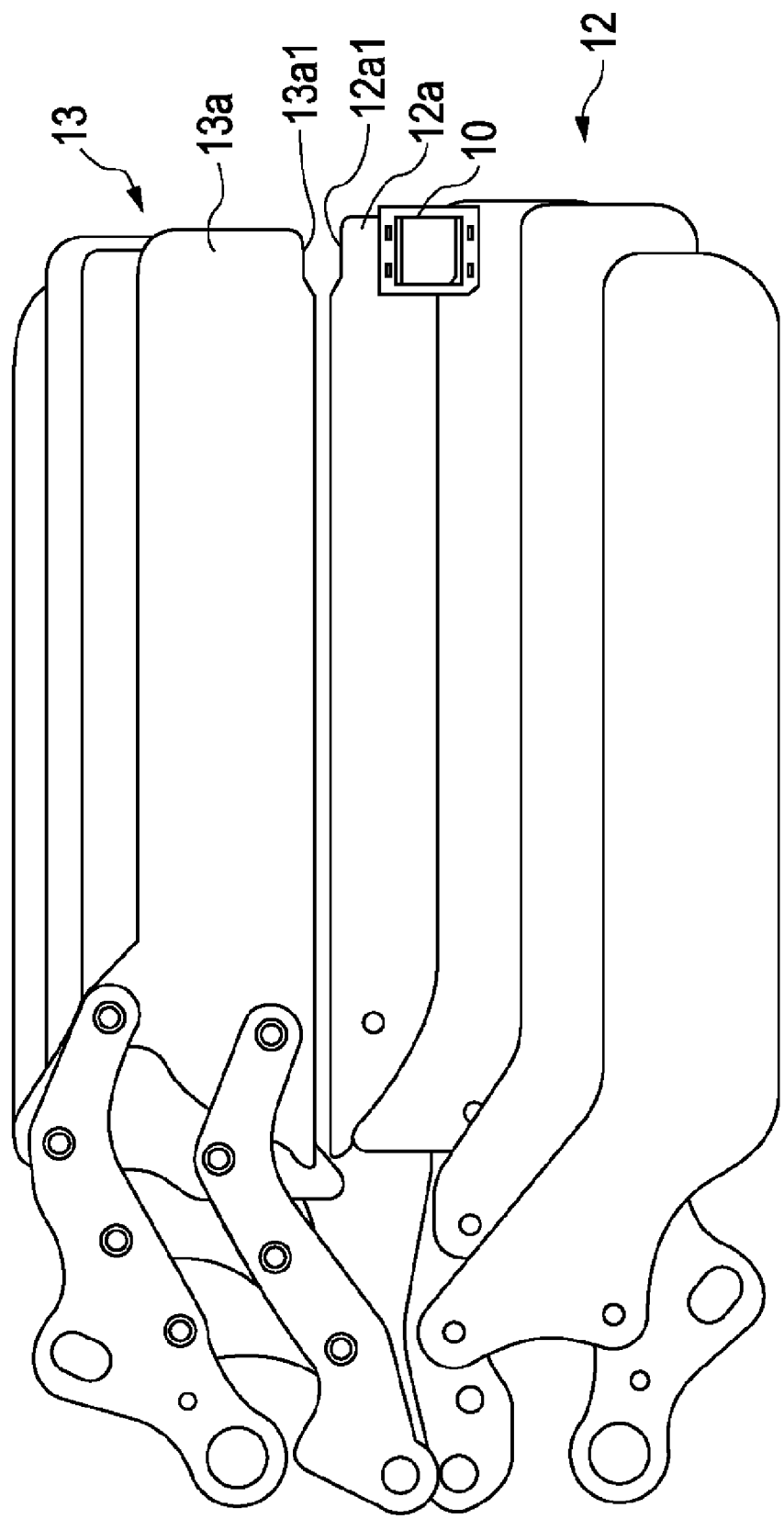
FIG. 1 is a front view of an example structure of shutter blades of a focal-plane shutter according to an exemplary embodiment of the present invention.
Figure 2:
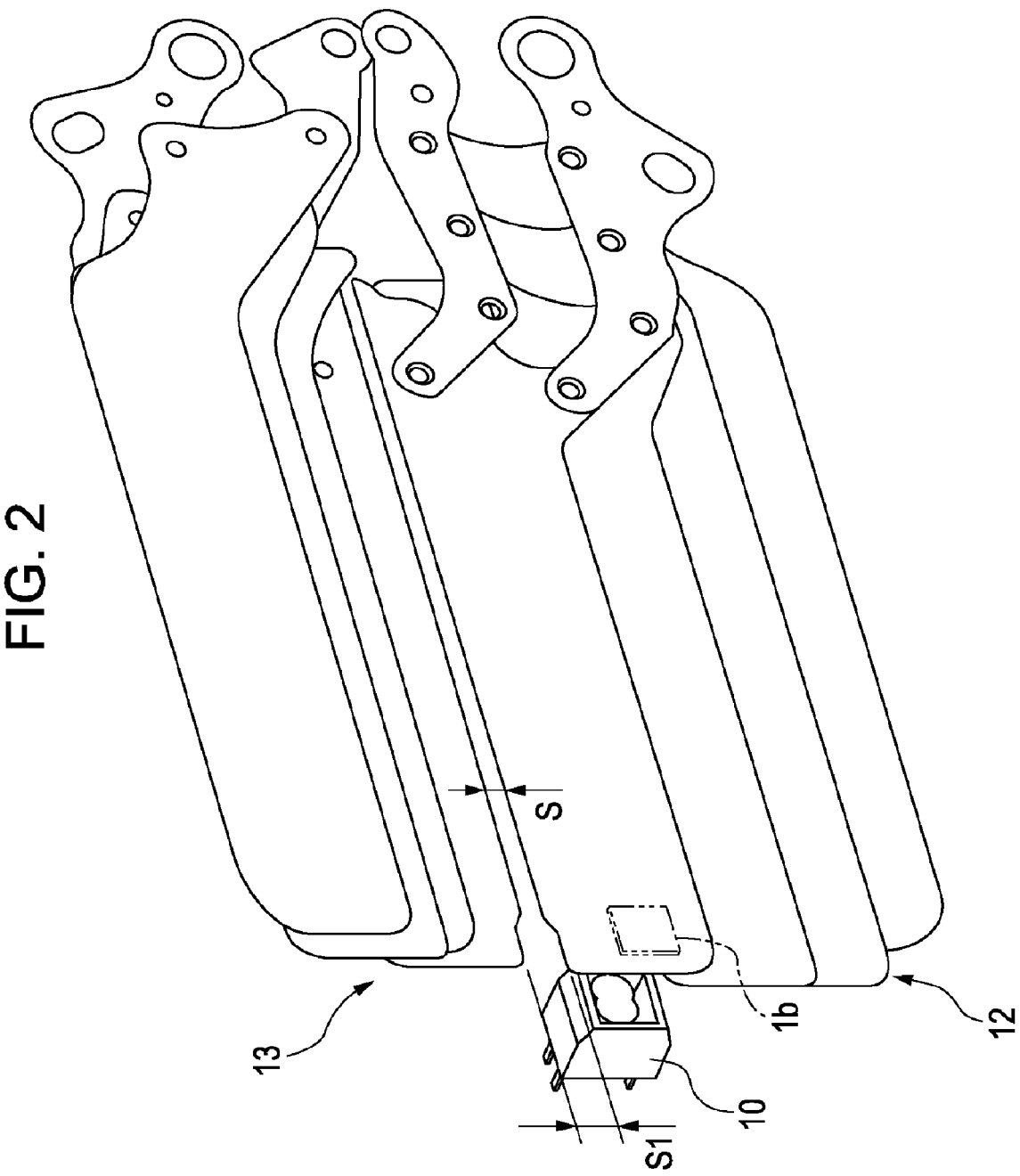
FIG. 2 is a perspective rear view of the structure of the shutter blades of the focal-plane shutter according to the exemplary embodiment of the present invention.

FIG. 1 is a front view of an example structure of a main portion of a focal-plane shutter according to the exemplary embodiment of the present invention. FIG. 2 is a perspective rear view thereof, showing a state in which the shutter is traveling. For simplifying reasons with regard to FIGS. 1 and 2, a shutter bottom plate is not shown.

In FIGS. 1 and 2, reference numeral 12 denotes a first blade unit, and reference numeral 13 denotes a second blade unit. Reference numeral 12a denotes a first blade of the first blade unit 12, and reference numeral 13a denotes a first second blade of the second blade unit 13. Second to fourth blades, a main blade arm, and a sub blade arm of the first blade unit 12, and second to fourth blades, a main blade arm, and a sub blade arm of the second blade unit 13 are the same as those of the related example, so that they will not be described below.

The first blade 12a and the first second blade 13a have respective cut-away portions 12a1 and 13a1 at respective ends thereof where a slit width is measured by a PR element 10. Accordingly, the slit width at the measurement portion is large. Therefore, when the shutter precision is reduced or the blades are closed, that is, when a slit width S of the shutter shown in FIG. 2 becomes very small or zero, a slit width S1 at the measurement portion where the cut-away portions 12a1 and 13a1 are provided is provided. Consequently, the PR element 10 can measure an open time of a slit formed by the first blade unit 12 and the second blade unit 13.

The shutter precision depends upon the degree of error equal to the sum of a mechanical error and an electrical error, with respect to an ideal shutter when it is being assembled. The smaller the error, the higher the shutter precision.

Correction of a shutter precision change and detection of closure of the blades using the first blade unit 12 and the second blade unit 13 having the above-described structure will now be described.

First, in an initial stage of assembling the shutter, after adjusting the shutter precision, a slit passage time is measured on the basis of an output of the PR element 10 at a maximum speed time (for example, 1/8000 seconds) to measure a time T1. The time T1 is equal to a shutter time T (0.122 msec if the maximum speed time is 1/8000 seconds) and a time Tp of passage of the cut-away portions 12a1 and 13a1, provided at the end of the first blade 12a and the end of the first second blade 13a, respectively.

$$T1 = T + Tp \Rightarrow Tp = T1 - T$$

Even when the passage time Tp is stored and the shutter time T is changed, if a change in the shutter precision, resulting from a change in, for example, durability, does not occur, the following holds. That is, for example, at 1/500 seconds, T'=1.953 msec, so that a measurement time T1' at this time is equal to T'+Tp. The time T1 is measured each time shooting is performed, so that a measurement result for the shooting is calculated as T1" and the shutter time at this time is calculated as T". That is, $$\Delta T = T1'' - (T'' + Tp)$$

If the shutter precision does not change, $\Delta T$ is equal to 0. For example, as regards the correction of precision change (that is, the correction of the durability of the shutter), when an exposure value is set beyond ±0.3 EV when the shutter time is 1/8000 seconds, the precision change is corrected. When $\Delta T$ exceeds +0.028 msec (corresponding to a value when the exposure value is +0.3 EV and the shutter time is 1/8000 seconds), or when $\Delta T$ becomes less than or equal to −0.024 msec (corresponding to a value when the exposure value is −0.3 EV and the shutter time is 1/8000), a shutter control time is corrected.

Figure 7:
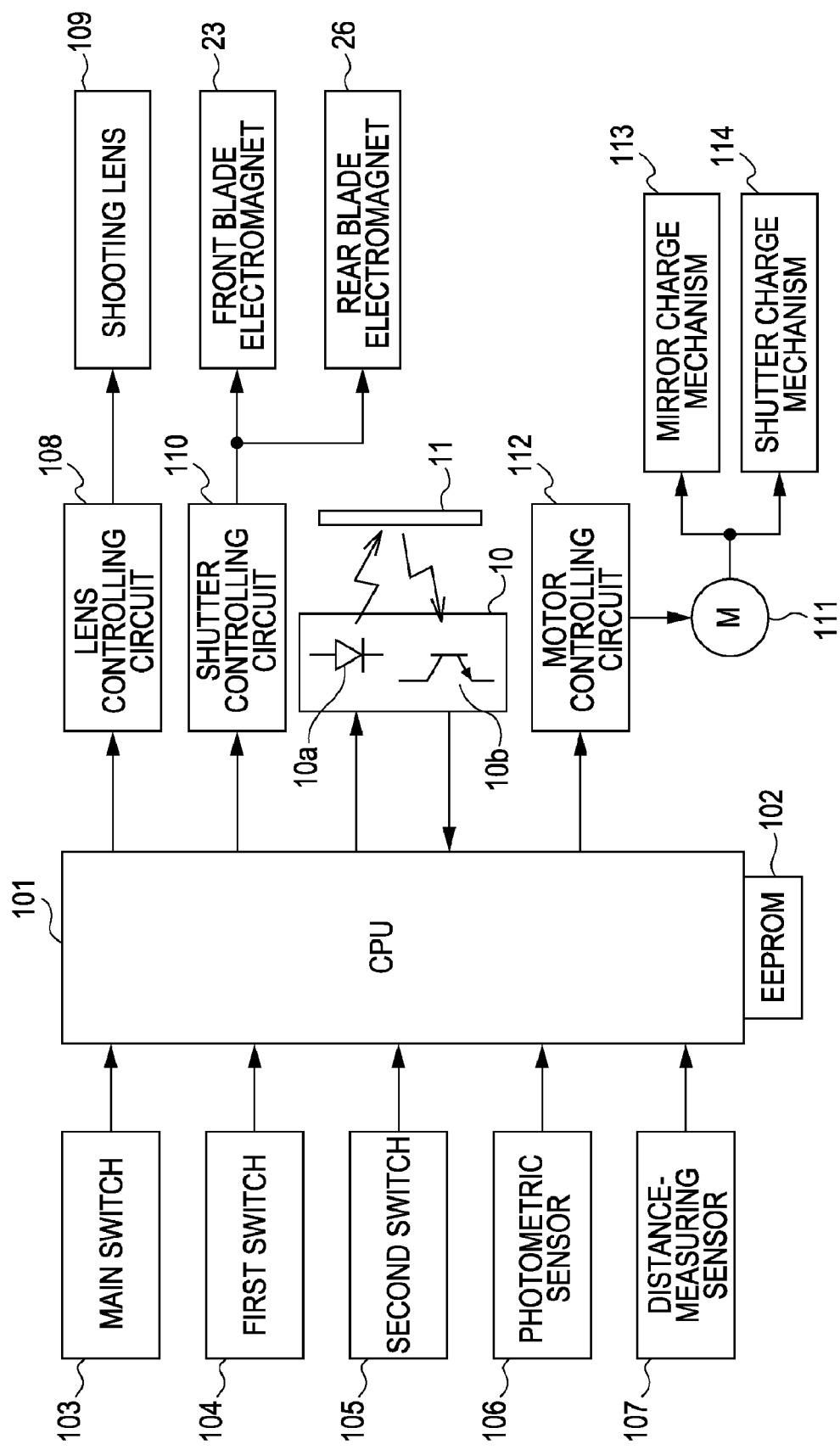
FIG. 7 is a block diagram of an electrical structure of a camera including the related focal-plane shutter or the focal-plane shutter according to the exemplary embodiment.

Here, the steps of an operation of the shutter of a camera including the focal-plane shutter having the structure shown in FIG. 1 will be described with reference to the flowchart of FIG. 3. An example circuit structure of the camera is similar to that shown in FIG. 7.

Figure 3:
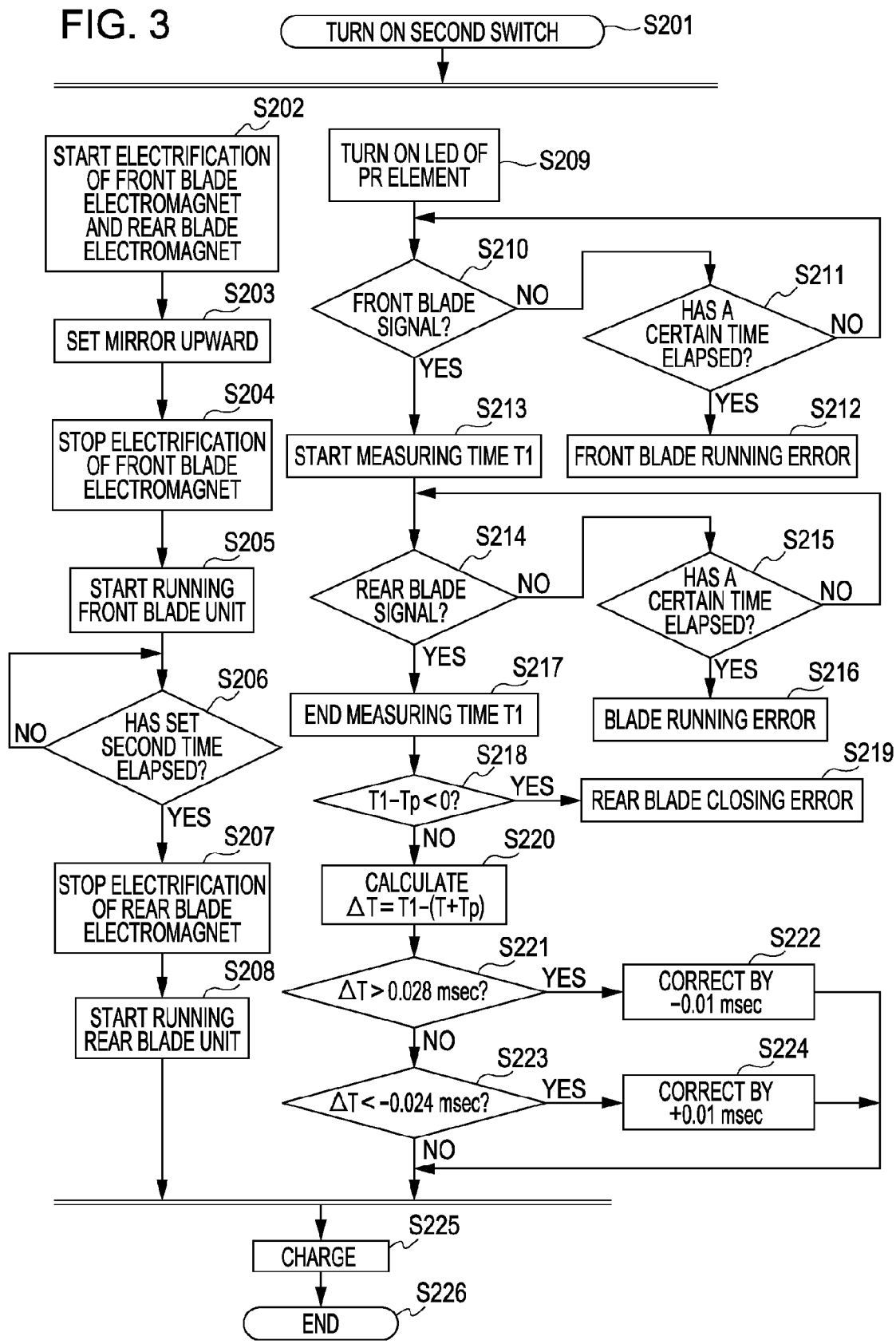
FIG. 3 is a flowchart of example steps of an operation of a camera including the focal-plane shutter according to the exemplary embodiment of the present invention.
Figure 4:
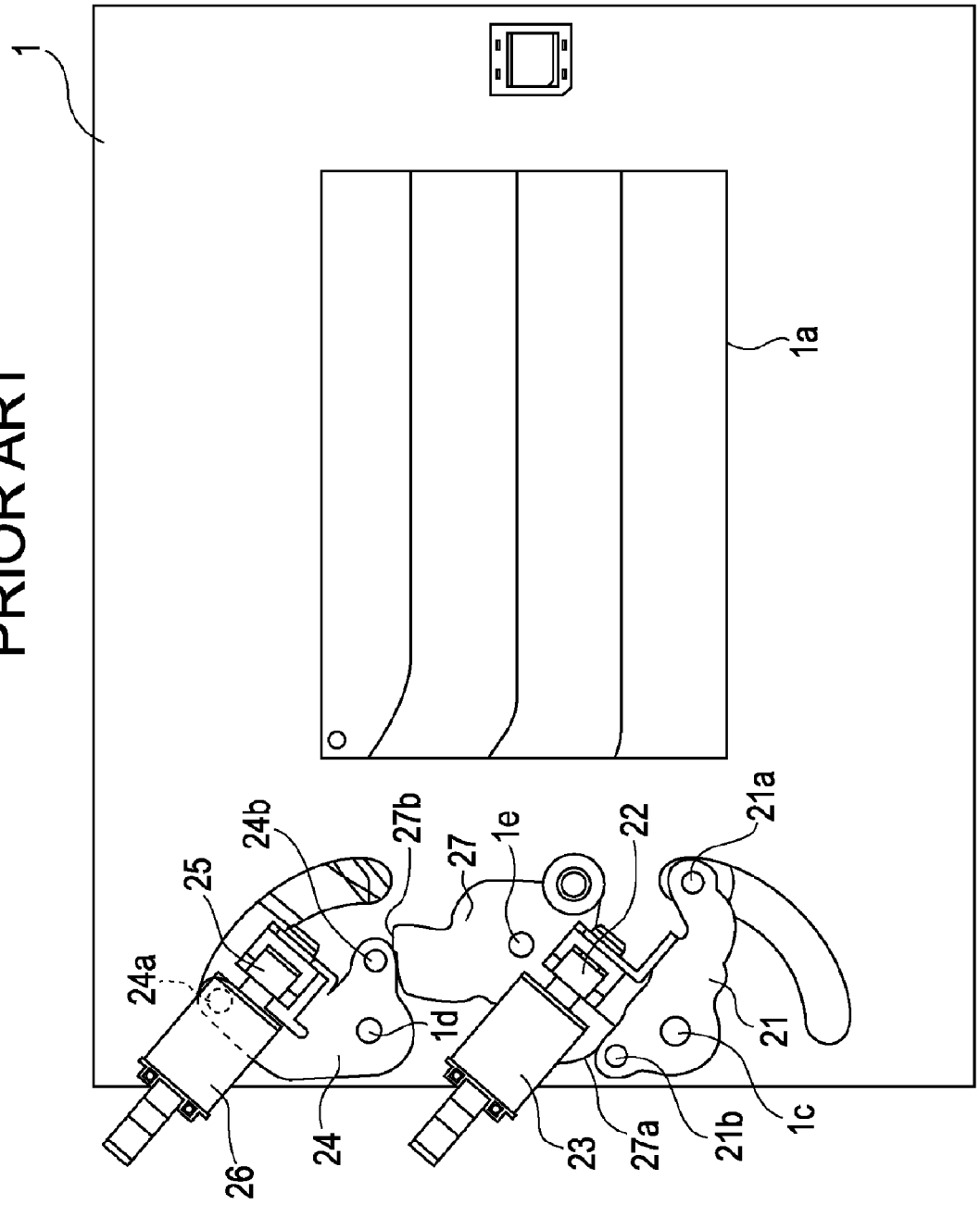
FIG. 4 is a front view of a driving section of a related focal-plane shutter.
Figure 5:
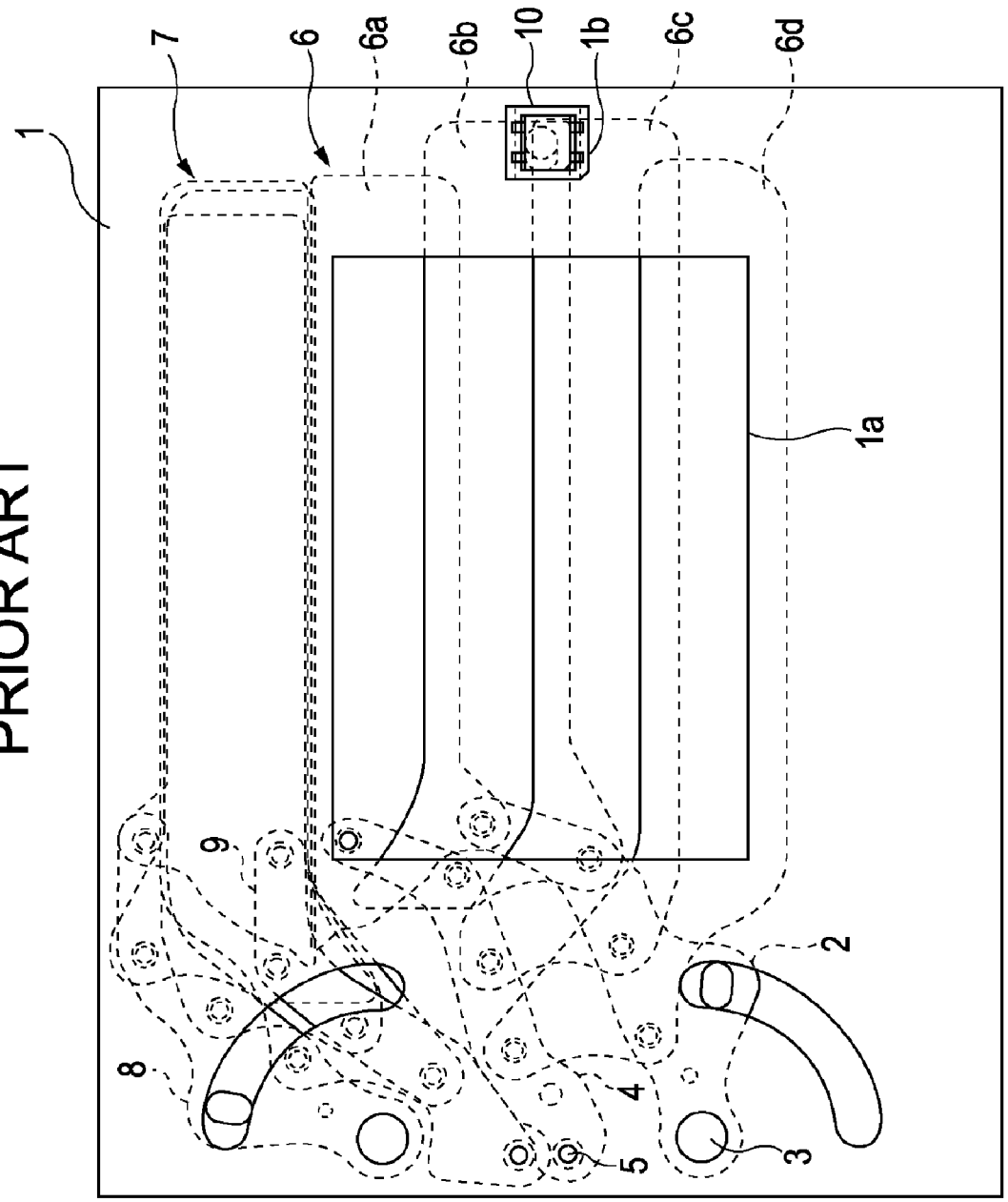
FIG. 5 is a front view of a structure of shutter blades of the related focal-plane shutter.
Figure 6:
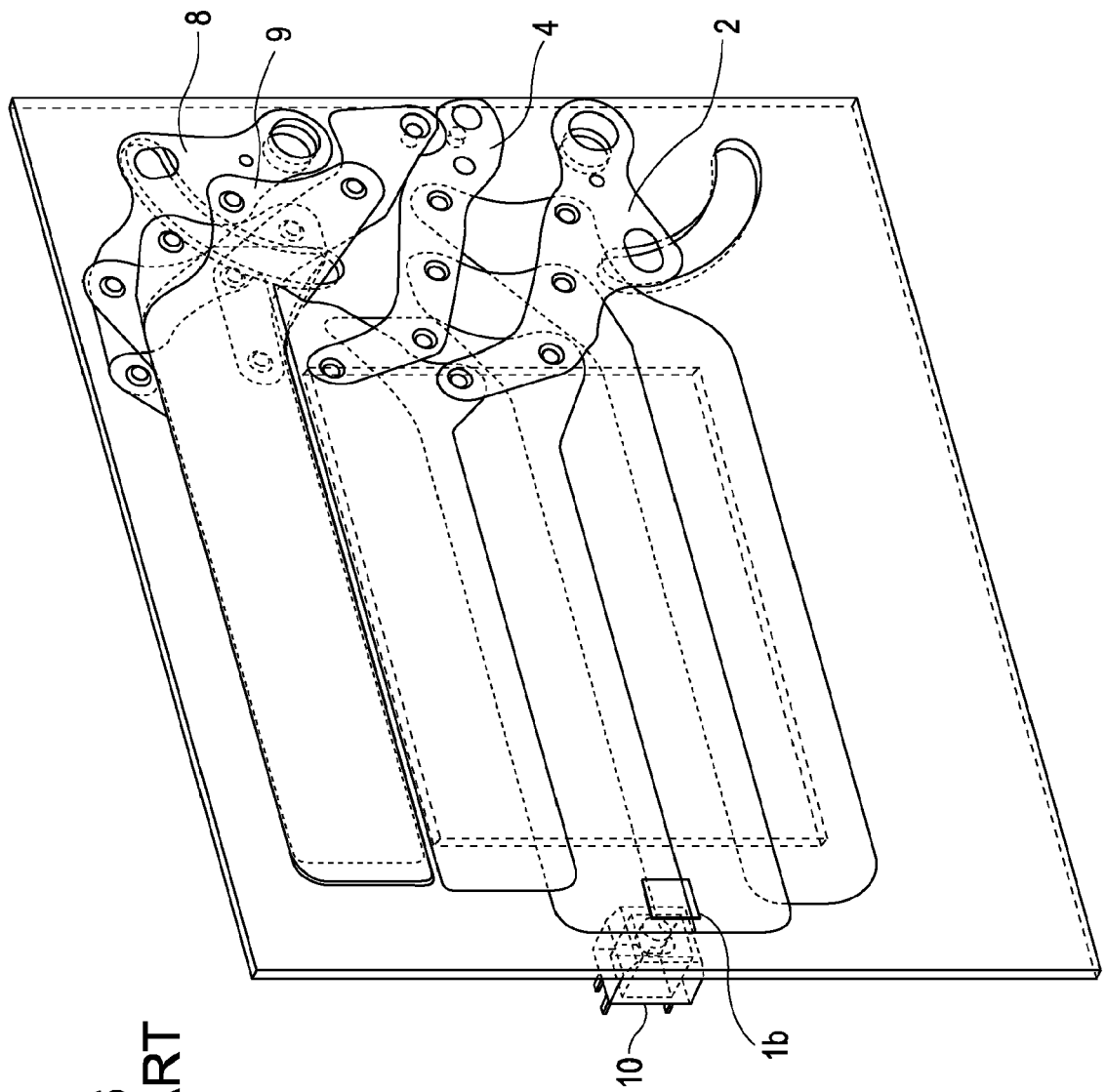
FIG. 6 is a perspective rear view of the structure of the shutter blades of the related focal-plane shutter.

Now referring to FIG. 3, in Step S201 a second switch 105 is turned on by pressing a release button up to a second stroke position. As a result then, Step S202 and the subsequent steps are started. In Step S202, as in the related art, a first blade electromagnet 23 and a second blade electromagnet 26 of the shutter are electrified. Then, in Step S203, a motor 111 is driven to withdraw a mirror (not shown) from a shooting light path. At the same time, a charge lever 27 is rotated counterclockwise from the state shown in FIG. 4, and a first blade driving lever 21 and a second blade driving lever 24 are made rotatable clockwise in FIG. 4 by biasing force of a driving lever spring (not shown).

Next, in Step S204, the electrification of the first blade electromagnet 23 is stopped. Then, in Step S205, the first blade unit 12 is operated, so that the first blade unit 12 starts opening. Thereafter, in the following Step S206, the shutter waits until the elapse of a set shutter time. During this time, a recording medium is exposed. After the elapse of the set shutter time, the process proceeds from S206 to Step S207 in which the electrification of the second blade electromagnet 26 is stopped. In the following Step S208, the second blade unit 13 is operated, so that the second blade unit 13 starts closing.

Figure 8:
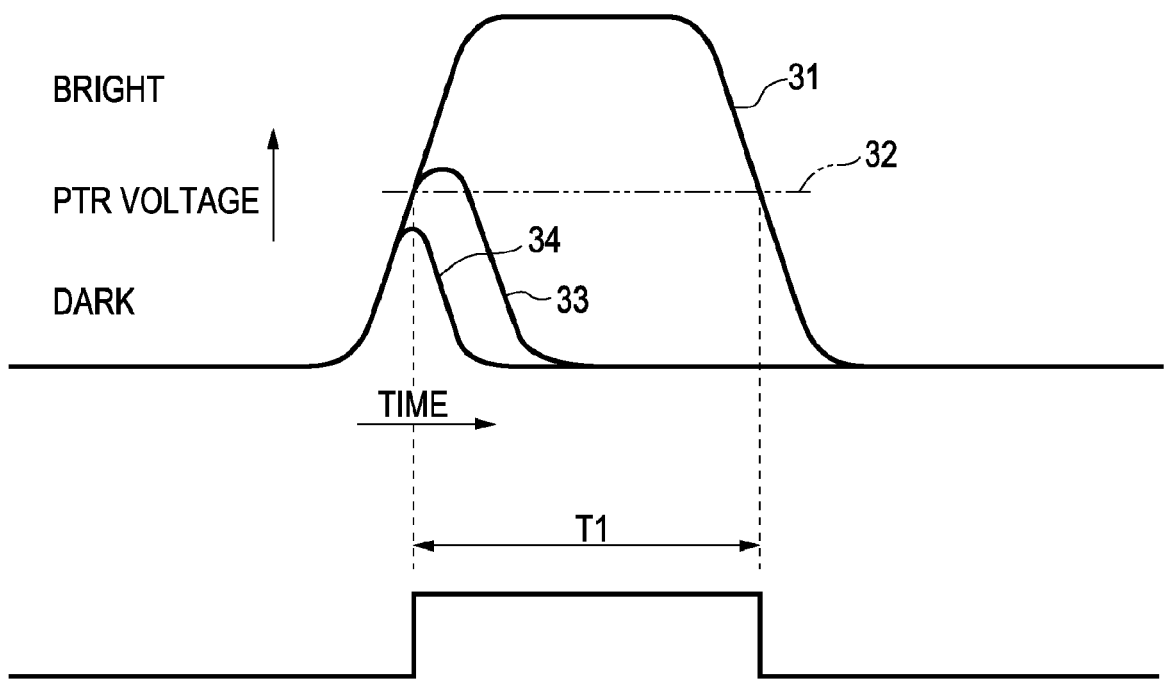
FIG. 8 illustrates a change in output voltage of a PTR of the related focal-plane shutter.

At the same time that the first blade unit 12 starts operating, in Step S209, an LED 10a of the PR element 10 is turned on, and a detection of the operation of the shutter is started. Then, in the following Step S210, a determination is made as to whether or not a bright signal (which changes from a dark state to a bright state as shown in FIG. 8), that is, a first blade signal is detected. If it is not detected, the process proceeds to Step S211 to determine whether or not the first blade signal is detected within a certain time from when the electrification of the first blade electromagnet 23 is stopped. If the first blade signal is not detected within the certain time, a determination is made that a first blade running failure has occurred, so that the process proceeds to Step S212 to stop the operation of the camera due to a first blade running error.

When, in Step S210, the bright signal is detected as the first blade signal, the process proceeds to Step S213 to start measuring the slit-S-passage time T1. Then, in the following Step S214, a determination is made as to whether or not a dark signal (which changes from a bright state to a dark state), that is, a second blade signal is detected. If the second blade signal is not detected, the process proceeds to Step S215 to determine whether or not the second blade signal is detected within a certain time from when the electrification of the second blade electromagnet 26 is stopped. If the second blade signal is not detected within the certain time, a determination is made that a second blade running failure has occurred, so that the process proceeds to Step S216 to stop the operation of the camera due to a second blade running error.

When, in Step s214, the dark signal is detected as the second blade signal, the process proceeds to Step S217 to end the measurement of the time T1 and to store the measurement result of the time T1. Then, in the following Step S218, a determination is made as to whether or not the time T1 is less than the passage time Tp (that is, whether or not T1−Tp<0) from the value of the time T1 and the value of the passage time Tp of the cut-away portions 12a1 and 13a1. If T1−Tp<0, the shutter open time is less than or equal to 0, so that the process proceeds to Step S219 to stop the operation of the camera due to a blade closing error. This phenomenon occurs, for example, when a time until a second blade armature 25 is separated after the electrification of the second blade electromagnet 26 is stopped (due to, for example, foreign substance being interposed between attraction surfaces of the second blade electromagnet 26 and the second blade armature 25 of the second blade driving lever 24) is made very short.

In contrast, when T1−Tp<0 does not hold, the process proceeds from Step S218 to Step S220 to calculate ΔT using the formula "T1−(T+Tp)," and to store the calculation result. Then, in the following Step S221, a determination is made as to whether or not ΔT>0.028 msec. If ΔT>0.028 msec, the exposure value is an overexposure value that is greater or equal to 0.3 EV when the shutter speed is 1/1800 seconds. Accordingly, a determination is made that the shutter control time needs to be corrected, so that the process proceeds to Step S222. In Step S222, prescribed values of all the shutter times are made smaller by −0.01 msec (off-set correction). This overexposure phenomenon occurs when, for example, a time until a first curtain armature 22 is separated after the electrification of the first blade electromagnet 23 is stopped (due to, for example, foreign substance being interposed between attraction surfaces of the first blade electromagnet 23 and the first curtain armature 22) is reduced. As mentioned above, the aforementioned correction is called an off-set correction (durability correction).

If, in Step S221, a determination is made that ΔT>0.028 msec does not hold, the process proceeds to Step S223 to determine whether or not ΔT<0.024 msec. Here, if ΔT<0.024 msec, the exposure value is an underexposure value that is at or beyond −0.3 EV when the shutter speed is 1/8000 seconds. Therefore, a determination is made that the shutter control time needs to be corrected, so that the process proceeds to Step S224. In Step S224, prescribed values of all the shutter times are increased by +0.01 msec (off-set correction). This underexposure phenomenon occurs when, for example, a time until the second curtain armature 25 is separated after the electrification of the second blade electromagnet 26 is stopped (due to, for example, foreign substance being interposed between the attraction surfaces of the second blade electromagnet 26 and the second curtain armature 25 of the second blade driving lever 24) is reduced.

When none of the aforementioned errors occurs, the process proceeds from Step S223 to Step S225 to charge the shutter. Then, in the following Step S226, the camera stops operating and is set in a waiting state.

According to the above-described embodiment, the shutter includes a blade member (which limit the time of exposure performed on a recording medium, in accordance with the magnitude of the slit width S formed when the first blade unit 12 and the second blade unit 13 travel) and a PR element 10 (which detects the state of the slit width S). In addition, to increase the slit width S1 at a slit-width-S state detection portion (detected by the PR element 10) with respect to the slit width S of a portion that limits the exposure time, the blade member, that is, the first blade unit 12 and the second blade unit 13 are provided with cut-away portions 12a1 and 13a1, respectively. By virtue of such a simple structure, it is possible to precisely measure the shutter open time, so that a precise off-set correction and a precise blade closing detection are performed.

Although, in the above-described embodiment, the determination of a blade closing error is made on the basis of whether T1−Tp<0, for example, when the exposure value is an underexposure value that is at or beyond −2.0 EV, it is possible to perform a controlling operation on, for example, generation of a warning. This is represented by the formula "T1−Tp<(set time/4)," and becomes "T1−Tp<0.0305 msec" when the shutter speed is 1/8000 seconds.

In the embodiment, a 0.01-msec off-set correction is made when the time falls outside a prescribed value when the off-set correction is carried out. This method is effective because the correction is not excessively carried out when, for example, the time falls outside the prescribed value due to brightness ununiformity at a screen. However, when the exposure value changes on the order of 1.0 EV, the time does not fall within the prescribed value when a plurality of shutter operations are not repeated. The amount of off-set correction may be changed in accordance with the precision change amount at this time.

Although, in the embodiment, the cut-away portions 12a1 and 13a1 are provided in the respective first blade 12a and first second blade 13a, a cut-away portion may be provided in either one of the first blade 12a and the first second blade 13a.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Application No. 2006-312483 filed Nov. 20, 2006, which is hereby incorporated by reference herein in its entirety.

What is claimed is:

1. A shutter device comprising:
    a blade member including a first blade, a second blade, and a detection portion, the blade member being configured to control a time of exposure, performed on an image pickup surface, on the basis of a magnitude of a width of a slit, the slit including slit portions and being provided when the first blade and the second blade travel; and
    a detecting unit configured to detect a state of the slit width, wherein a cut-away portion is provided at the blade member so that a width of the slit portion at the detection portion of the blade member is wider than a width of the slit portion at a limiting portion of the blade member, the detection portion being detected by the detecting unit, the limiting portion limiting the exposure time.

2. The shutter device according to claim 1, wherein a time in which the blade member passes the cut-away portion is previously measured and stored, so that a closing operation of the blade member is controlled on the basis of the stored time and a value detected by the detecting unit.

3. The shutter device according to claim 2, wherein a determination is made as to whether or not a shutter precision is changed, on the basis of the stored time and the value detected by the detecting unit, so that, when the shutter precision is changed, the exposure time is corrected.

4. An image pickup apparatus comprising:
    a blade member including a first blade, a second blade, and a detection portion, the blade member being configured to control a time of exposure, performed on an image pickup surface, on the basis of a magnitude of a width of a slit, the slit including slit portions and being provided when the first blade and the second blade travel; and
    a detecting unit configured to detect a state of the slit width, wherein a cut-away portion is provided at the blade member so that a width of the slit portion at the detection portion of the blade member is wider than a width of the slit portion at a limiting portion of the blade member, the detection portion being detected by the detecting unit, the limiting portion limiting the exposure time.

* * * * *